(12) United States Patent
Fuchs (10) Patent No.: US 11,257,115 B2
(45) Date of Patent: Feb. 22, 2022

(54) PROVIDING ADDITIONAL DIGITAL CONTENT OR ADVERTISING BASED ON ANALYSIS OF SPECIFIC INTEREST IN THE DIGITAL CONTENT BEING VIEWED

(71) Applicant: Gil Emanuel Fuchs, Nes Tziona (IL)

(72) Inventor: Gil Emanuel Fuchs, Nes Tziona (IL)

(*) Notice: Subject to any disclaimer, the term of this patent is extended or adjusted under 35 U.S.C. 154(b) by 790 days.

(21) Appl. No.: 14/843,407

(22) Filed: Sep. 2, 2015

(65) Prior Publication Data

US 2016/0063549 A1 Mar. 3, 2016

Related U.S. Application Data

(60) Provisional application No. 62/044,904, filed on Sep. 2, 2014.

(51) Int. Cl.
*G06Q 30/02* (2012.01)

(52) U.S. Cl.
CPC ..... *G06Q 30/0255* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 6,112,240 A | 8/2000 | Pogue et al. | |
| 6,615,208 B1 | 9/2003 | Behrens et al. | |
| 7,181,438 B1* | 2/2007 | Szabo | G06F 17/30522 |
| 7,478,089 B2 | 1/2009 | Henkin et al. | |
| 7,882,115 B2* | 2/2011 | Hirsch | G06F 17/30899 |
| | | | 707/755 |
| 8,775,975 B2* | 7/2014 | Karmarkar | G06F 3/013 |
| | | | 345/473 |
| 2004/0111432 A1 | 6/2004 | Adams et al. | |
| 2005/0091106 A1 | 4/2005 | Reller et al. | |
| 2005/0216844 A1 | 9/2005 | Error et al. | |
| 2007/0208719 A1* | 9/2007 | Tran | G06F 16/951 |
| 2008/0027798 A1 | 1/2008 | Ramamurthi et al. | |
| 2011/0029511 A1 | 2/2011 | Kodialam et al. | |
| 2011/0093479 A1 | 4/2011 | Fuchs | |
| 2012/0066359 A1 | 3/2012 | Freeman et al. | |
| 2012/0150784 A1* | 6/2012 | Mital | G06F 16/951 |
| | | | 706/46 |
| 2012/0280908 A1* | 11/2012 | Rhoads | G06Q 30/0269 |
| | | | 345/156 |
| 2013/0080434 A1 | 3/2013 | Subasic et al. | |

(Continued)

OTHER PUBLICATIONS

Fuchs, Gil E., "Practical Natural Language Processing Question Answering Using Graphs", Dec. 2004, PhD Dissertation, University of Santa Cruz, Dec. 2004.

*Primary Examiner* — John Van Bramer
(74) *Attorney, Agent, or Firm* — Downs Rachlin Martin PLLC (57) ABSTRACT

Systems and methods are described to provide additional relevant content to a viewer of digital media such as a webpage. A webpage being viewed is divided into regions and in each region, statistics are compiled on pertinent words and phrases. Statistically significant words and phrases are compared with semantically similar words and phrases in the additional content. Where there is a significant match between the viewed content and available additional content, the additional content is provided to the user.

16 Claims, 3 Drawing Sheets

(56) References Cited

U.S. PATENT DOCUMENTS

| | | | | |
|---|---|---|---|---|
| 2014/0089097 A1* | 3/2014 | Byun | ............... | G06Q 30/0267 |
| | | | | 705/14.64 |
| 2014/0180829 A1* | 6/2014 | Umeda | ............. | G06Q 30/0273 |
| | | | | 705/14.69 |
| 2014/0344012 A1* | 11/2014 | Kamhi | ................... | G06F 3/013 |
| | | | | 705/7.29 |

* cited by examiner

PROVIDING ADDITIONAL DIGITAL CONTENT OR ADVERTISING BASED ON ANALYSIS OF SPECIFIC INTEREST IN THE DIGITAL CONTENT BEING VIEWED

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

PRIORITY CLAIM

This invention claims priority to U.S. Provisional Application 62/044,904 file 2014 Sep. 2 which is herein incorporated by reference.

The invention is related to U.S. Pat. No. 8,880,537, entitled "SYSTEM AND METHOD FOR USE OF SEMANTIC UNDERSTANDING IN STORAGE, SEARCHING AND PROVIDING DATA OR OTHER CONTENT INFORMATION" and is incorporated herein by reference. "PRACTICAL NATURAL LANGUAGE PROCESSING QUESTION ANSWERING USING GRAPHS", PhD dissertation by Gil Emanuel Fuchs, University of California Santa Cruz, December 2004, is also related and is herein incorporated by reference.

FIELD OF INVENTION

Embodiments of the invention are generally related to identification of the main topics associated with digital media with at least part represented as text and more specifically what information within a displayed text and/or associated graphics is of importance to the viewer and then utilizing this identified information for tasks such as targeted advertising or to direct a user to similar content.

BACKGROUND

Often when viewing a website or other form of digital media, the underlying information being provided can be used to give an indication of what the user is interested in. This can in-turn be used to provide further content in the form of advertising of products or services that are targeted based on the content.

Web pages and similar media can be complex and provide a variety of information, therefore to more specifically target follow-on information, there is a need to know what content that a user is looking at and is of primary interest. One way to do this is to monitor the precise location that a user is looking and for how long they are viewing to more precisely target areas of interest. This can be achieved by tracking the physical interaction of the user with the digital media, by for example tracking mouse movements and/or or eye movement relative the page. The location and resulting content can be analyzed using a variety of techniques such as semantic analysis of the text being viewed to predict what specific content the view is interested in.

Another method is to simply count keywords or phrases in the text and text associated with included graphics and supply additional content or advertising with similar word counts.

Glossary

Text Based Digital Media: Any form of media that can be presented on a screen and is made up of characters. The digital media may also include imbedded images, videos, graphs or charts. Example of text based digital media are: web pages, blogs, e-reader content, pdfs, spreadsheets, text editor documents, and emails. Also of importance is imbedded text associated with the viewable media and images, that is hidden—for example the underlying HTML of a webpage or XML or CSS.

Interest Indicators: Any measurable activity that may be related to how interested a user of digital media is in the media they are viewing. These activities could include the duration of viewing and the location within a text that a user is viewing or activities such as mouse clicks that could indirectly point to this; clicking on certain buttons, imbedded information in images about content; semantic parsing of key words or phrases that occur in text being viewed; search terms utilized when scanning text, simple or weight word counts in the digital media and many others.

Normalized: With respect to a word count, and comparing more than one word count, the basis for the count must be the same. If a document had 2000 words (10 pages) and twenty instances of the word "dog", then word count would be normalized by putting it in terms of an average word count per page or the average number of instances of a word per 100 words for example. So in this case, the word count could be expressed as 2 per page or 1 in every 200 words.

BRIEF SUMMARY OF THE INVENTION

It is an object of this invention to determine both the location and the content within digitally presented text/image based media that a user is looking at.

Location within a digital media can be determined by tracking eye movement, mouse or other pointing device position, scroll bar position/s and duration and the like.

It is a further object of this invention to take this information and determine appropriate follow-on targeted advertising and/or addition similar content or links to similar content.

Determination of how useful the targeted advertising and content and links are is tracked by how often users proceed to the additional content or links.

Based on the above, the targeting for additional content or advertising is refined by weighting indications of what are important to the user once metrics are determined on how often a user follows suggested links or looks at additional content or advertising. For example, it may be determined that a mouse being stationary over a certain point on a website may be less important of an indication of interest than if the scroll bar has not been manipulated for the same amount of time.

It an object of this invention to filter indications of interest in a particular portion of digital media based on when a user is engaged vs when they are not. For example, if a user's mouse is hovering in a certain location for an amount of time, but yet the user is not at the computer, then the user is not engaged and therefore the mouse location information is of no use.

A function of the present invention is to rate factors associated with interest with respect to digital media.

It is an embodiment of this invention, to monitor word counts of media presented to a user and the average duration of those word counts over time to be used as a predictor of interest in the content. The relative word count in the media being viewed can then be compared to the relative word count of additional media and where the relative word counts are similar in the additional media, present that media to the user.

It is an aspect of this invention to survey what content is of most importance to a collection of users and use this information to better target the content in future revisions.

It is an aspect of this invention to utilize the above techniques to determine the value of advertising content.

Other aspects of the invention will become apparent after reading this document.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE FIGURES

Overview

One overall goal of this invention is to provide targeted advertising or additional content to a viewer of text based digital media that will be of interest to the viewer based on what they are viewing.

To achieve the above goal one aspect of this invention is to determine what portion or aspect of a text based digital media is most important to a user or group of users. This information is then used to find additional content to display to the user which can include targeted advertising based on the above, additional information similar in nature to the user's interest, or links to additional information.

In an embodiment where it is desired to determine specifics concerning when and where a viewer is viewing text based digital media, the following must be known:
  A mapping of the areas associated with each subset of the information displayed on a display screen and the time and duration the information was displayed.
  Where a user is looking on a display device at any given time. This could be broken into quadrants that, for example could be a specific part of a webpage or simply a grid in a grid pattern or certain lines of text.
  The actual content of each area.

Armed with the above information, then it can be determined what information the user was looking at and for how long.

Depending on where the user is looking and for how long, indicators can be developed to infer what is most important to the user.

Figure 2:
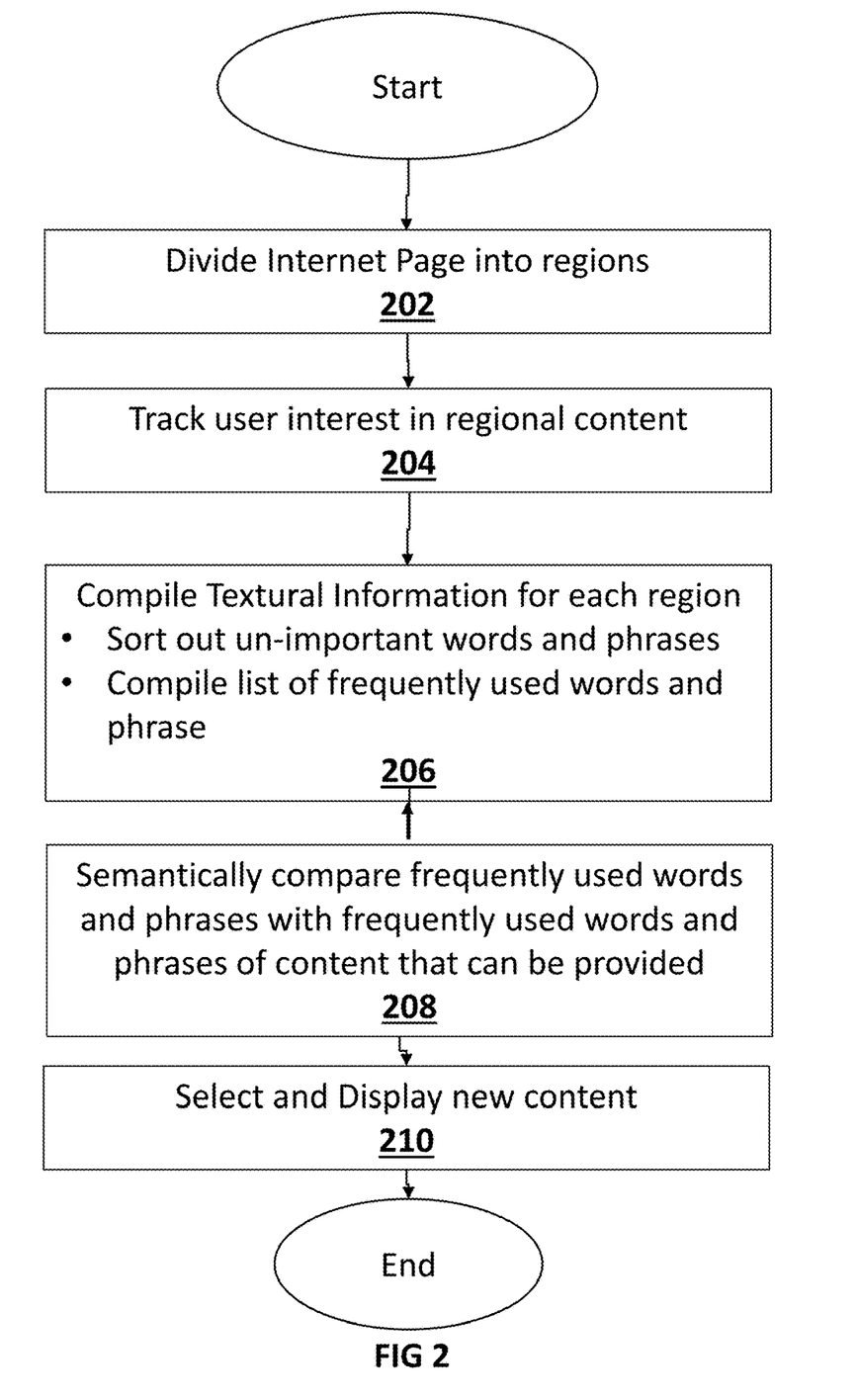
FIG. 2 is a flow chart of an embodiment of determining additional internet content of interest.

An embodiment is shown in FIG. 2. If a viewer of an internet page or web page or other digital media is looking at a particular web page or textural digital content, the page/s is divided into regions 202. The regions could be based on a particular element of html, for example a title or a frame; the regions could be based on a rectangular region of the content being displayed or presented to the user.

When a user is viewing the page or pages above, how it is tracked how long a user is looking at a particular region 204.

Textural information is compiled 206 which could be for example, be the visible text in the region, the text associated with the region both visible or imbedded in HTML or other non-visible information. Words or phrases found not to be of semantic importance are thrown out.

Previous to this analysis pertinent words and phrases have been counted and put in a semantic database.

The frequency of words and phrases are compared with the frequency of semantically similar words in phrases in the content to be provided using mean described later in this document 208. Based on the strongest correlations between the page being viewed and the additional content, additional content is selected and displayed to the user in a variety of ways 210.

Determining Location on the Display

In an embodiment, whatever text content is displayed or for that matter, text associated with the view but is hidden, must be subdivided into sections. If the document or page or active window being viewed is configured according to some standard, then the subdivision could be based on that standard.

If the digital media is a webpage, for example, the page might consist of a header, a footer, and navigation bar (either on the top, bottom, left side or right side). In addition if the page does not fit on the display screen, it may have scroll bars on the right and/or bottom of the screen generally. These subsections will be described in the code for the webpage, for example in html or cascading style sheets (CSS). In this code, it would describe what pixels are associated with what portion of the page.

Using the webpage example, assume there is a standard configuration and, for example, the page is a news feed. Further assume the user frequently clicks on a button that is a link for sports news in the index section of the page and sports is selected more often than a button for world news. It could be inferred that the user is more interested in sports new than world news. The number of clicks on the sports news buttons could be determined by tracking when the mouse is over the location of the button (as described in the HTML) and when the mouse button is clicked.

If the display is simply a text document or a section of the display that the user is looking at is a text area, there may be no subsections of the page or subsections of the text that are meaningful. In this case, then it may be necessary to semantically map the text for given lines or a quadrant of the display area and to determine key words that may indicate what the user is interested in. This will be described more in a later section.

Ideally to determine where on a display screen a user is looking, it would be desirable to track eye movements and barring that, head movements. Devices that interface with a computer that track eye or head movement exist in the art. If one is available and the user is willing to wear a device or turn on a free standing device, then this is one of the most desirable methods for determining what portion of digital media a user is viewing. One simply needs to know the relative position of the screen to the eyes/head, the orientation of the gaze with respect to the screen, and what content is were on the screen and when the content is there.

Other methods to detect the viewing location for a user include:
  Tracking the mouse (or other pointing device) location on the viewing screen
  Tracking the relative location of scroll bars (for pages that spill off the viewing screen)
  Monitoring search words used when viewing text If images are imbedded with the text, determining the subject of the image With respect to scrolling, it can be assumed that in general the point of interest will be in the center of the window or screen that is active. By knowing the relative location of the scroll bars, this can be determined. Likewise the duration that the scroll bars are in one position can also be monitored with techniques known in the art.

Determining Preferred Content Based on Duration of Use and Location within a Display Through methods described above, it can be determined what text is on a display and for how long. It will also be known how much text is on the display based on the font size and the size of the display. How long individual lines of text are displayed can be determined based on what portion of a document is displayed at any given time. By performing semantic analysis of the information displayed on a screen, key phrases or words (and words or phrases that are synonymous) that appear can be tallied. Key words or phrases that appear the most can be inferred to be of the most interest.

In analysis in the art, if for example, a user was looking at a website concerning movies, it may be assumed that the user may be interested in anything to do with movies.

In an embodiment of the present invention, if the text that was being viewed was analyzed, it may be found that the phrase "Johnny Depp" comes up frequently and for long duration relative to other phrase during the viewing of the article. This information could then be used to search for additional content or advertising on movies associated with "Johnny Depp" instead of movies in general.

As mentioned previously, there may be mixed media on the display, including not only text, but images and/or video and/or other forms of graphics. If a topic can be inferred from the mixed media (in addition to the analysis of the text), this may also be of value in determining primary interest to the viewer. For example, certain types of images may have imbedded tags within the image file that describe what the image depicts. Or in some situations, the title of the image itself may be descriptive. So if any embedded tags within the image or the title of the image are analyzed, this will provide additional input that could imply primary interest on the user's part.

Determining Preferred Content by Counting Words

In an embodiment of the present invention, the assumption is made that a viewer is viewing an entire document. Words counts in a basic form would consist of counting each word, or phrase (generally ignoring common words that would not be associated with the topic of the text—for example "as", "the", "and", etc) in a text based media, then comparing a normalized count of words in the viewed media, with the normalized count of words in proposed additional media or advertising. Also compare the relative ratio of each word count between the viewed media and the proposed additional media or advertising. When the proposed media matches closely to the viewed media, then present the proposed media or link to the viewer.

It can readily be identified by the underlying structure of digital media, what content is on a display screen or in an open and active window on a display screen. It is also readily known in the art how to measure how long a particular display is visible. For example, if a user is viewing a text document on a display, the display is generally static, until such time as the users inputs via a pointing device or other means that they would like to scroll or go to a different part of the text that is not visible. This can happen gradually such as scrolling down a text or could happen abruptly by, for example, entering a search string and moving to sequential locations that contain that search string.

Figure 1:
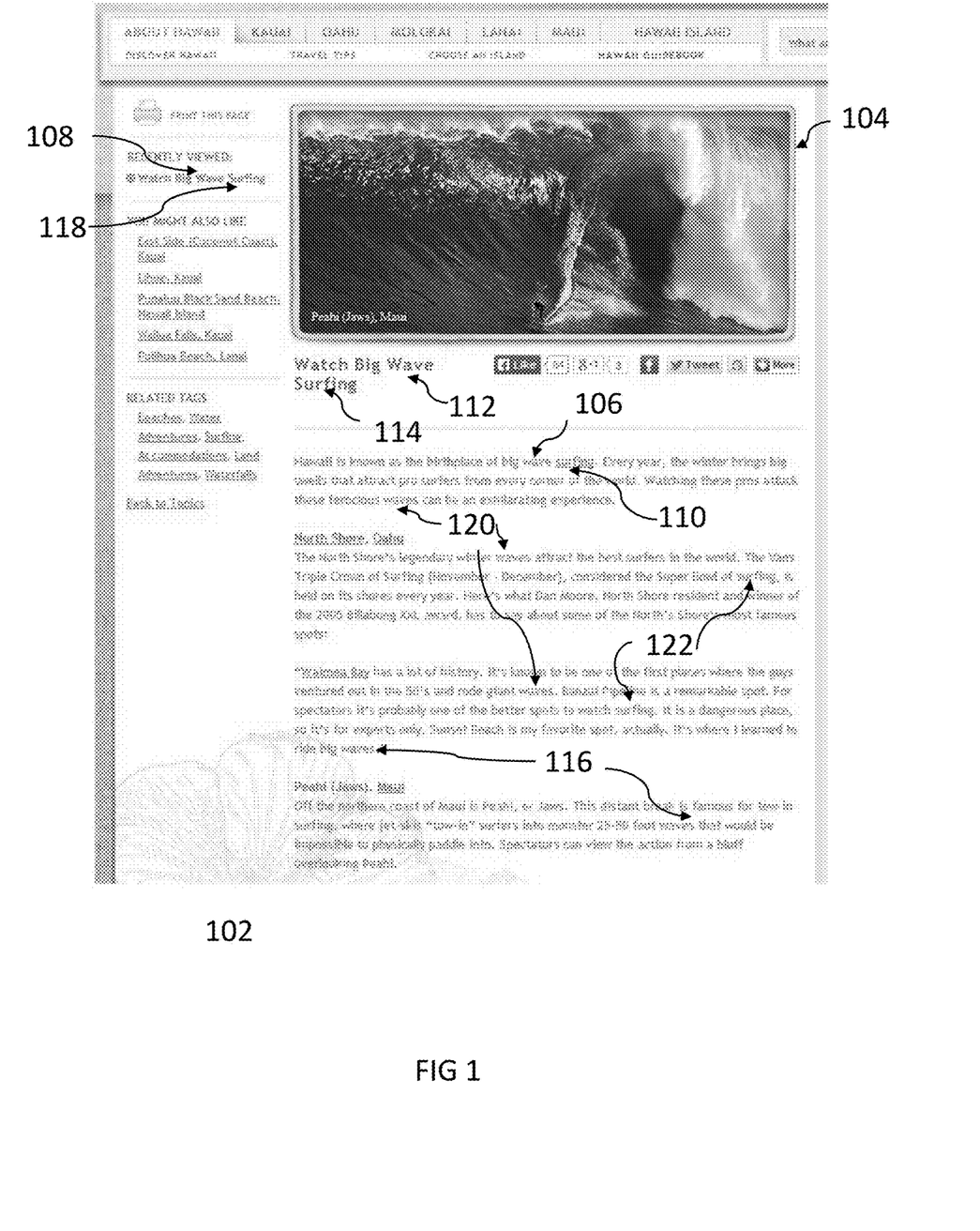
FIG. 1 is an example portion of a webpages pointing out word counts.

In an embodiment the prediction of user interest in subject matter is a function of the words in the view of the user and the duration those words are there. For example, FIG. 1 is a typical portion of a webpage 102. Notice that there are several instances of die word "wave" visible 106, 108, 112, and if you include words with a root word of "wave" also 116 and 120. This makes 8 instances of the word "wave" on a stationary page. Assume that while monitoring user activity, it was determined that this screen shot was up for 30 seconds. If the user scrolled down the page (ignore the scrolling time in this example), then, for example, 4 of the previously viewed instances of "wave" may still be visible and perhaps 2 new instances appear further down the text. If this modified view was up for 20 seconds then the new tally of 6 instances of "wave" over 20 seconds. Combing the two measurements, on average the user was exposed to ((8*30)+(6*20))/(30+20)=7.2 instances of "wave".

Similar word counts are made for all other words on the visible page. In an embodiment, only nouns and verbs are counted as they are more likely to be indicative of user interest. In an embodiment, all words that have a similar root are collectively counted—for example, surf, surfing, surfer.

In one form, provided you have a database of additional content, that has word counts associated with it, you could compare the word count normalized based on the number of words on the page that was viewed by the user to the normalized word count of proposed additional content— whether that content is a web page, an article or advertising material. If the additional material had word counts in a predetermined range close to the word counts for key words of the viewed material, and the numerical ordering of the word counts were similar, then either the material or a link to the material could be presented to the user for possible viewing.

In FIG. 1, notice the high instances of the words (or root words) "wave" 106, 108, 112, 116 and 120 and "surf" 110, 114, 118 and 122. If there is a high percentage of the terms "wave" and "surf" it is more likely that the user is interested in water sports than if there was a high percentage of the terms "wave" and "destruction" where the user may be more interested in natural disasters.

Taking the method still further, different instances of the same word on a page could have different weights associated with them. The weights could be a function of, for example, font size, font type (bold, italic), use in a header, use in a caption for a figure or a graph, use in a link, embedded in an image and the like. The more prominently displayed the word is on a page, the more weight it has in prediction of interest of the user—provided of course that the user takes time to view the prominently displayed material. By weighting, it is meant that word counts are modified based on the prominence of the word. Therefore, for example, the same word with an instance in a title may be classified as being equivalent to 10 instances in a text body. Note in FIG. 1. the image of a wave 104. The caption of the image 104 does not have the word "wave" in it, however if you look at the underlying html that specifies the source of the image (<img src=". . . / . . . /images/ALL%20HAWAII/allhawaii_resized/allhawaii/WatchBigWavePH07_9108.jpg" class="photo" width="516" height="234" alt="all hawaii images" style="top: 19px; left: 10px;">) notice that the word "wave" appears. Once again, the weight of the image name may be assigned to be higher than normal text. In an embodiment the word count associated with the image name and/or caption of the image may be weighted according to the relative space the image takes up on the page (in this case 516 by 234 pixels).

It is understood that how to weight word counts for certain types of display material is a function of a predetermined weighting criteria and this criteria may vary for types of media and/or change once feedback is established on how relevant additional content that is provided to a user is utilized and/or viewed.

In an embodiment word counts are only made on a subsection of the displayed material where the user is determined to be looking.

Determining User Interest by Observation of User Reaction

There exists in the art methods of monitoring individual characteristics and reactions. Many of these reactions when interpreted in relationship to displayed content may be indicative of interest in the content. For example, it is well known that facial expressions can express joy, frustration, anger, concentration and other state of emotion. Using techniques to monitor facial expressions, such as image analysis, for example, it can be postulated that strong emotion was related to interest in the content.

Similarly brain wave activity monitoring could show indications of interest in content. Subtle changes in skin temperature could indicated increased interest.

In the case of facial expressions, these could be detected by a camera located on top of a computer display or smartphone facing the user of the device.

Various sensors exist in the art for monitoring brain waves and skin temperature variations.

Finding Relevant Additional Content, Links or Advertising Media to Present to the User Embodiments of the invention require that proposed additional content and/or advertising media be indexed or have indicators such as word count, in the same manner as the text being viewed. Further text being compared must have indicators normalized in the same manner. For example, if the word counts are per page is used for the text being viewed, all word counts must be normalized per page.

Semantic Decomposition of Text and Finding Relevant Additional Content or Advertising Media Techniques exist in the art to allow capturing and interpreting semantics or meaning from text. In one example, a conceptual graph can be created from text being viewed. A plurality of conceptual graphs, or portions thereof, can be compared to determine matches with conceptual graphs of other text. An associative database can be generated and/or searched using a hierarchy of conceptual graphs, so that the data storage and searching of such database is optimized. The associative database can be used to find additional content or advertising from multiple different sources which can be presented to a viewer of digital media.

Additional information describing various aspects and examples of conceptual graphs, link grammars, and associative databases are described in "PRACTICAL NATURAL LANGUAGE PROCESSING QUESTION ANSWERING USING GRAPHS", PhD dissertation by Gil Emanuel Fuchs, University of California Santa Cruz, December 2004, which is herein incorporated by reference.

In an embodiment, a system and method for use of semantic understanding in searching and providing of additional content to a viewer of digital media is presented. In accordance with an embodiment, the system comprises a Syntactic Parser (SP) or statistical word tokenizer for data retrieval and parsing; a Syntax To Semantics (STS) transformational algebra-based semantic rule set, and an Associative Database (ADB), utilizing a conceptual graph formalism. Data can be represented within the ADB, enabling both fast data retrieval in the form of semantic objects and a broad ranging taxonomy of content, e.g. advertising categories. Each semantic object contains all the related terms and phrases articulating a specific subject, enabling automatic categorization of any given page. This semantic approach can be used in a variety of ways, for example to improve the ability to serve ads based on the meaning of a website's page content. By semantically analyzing the web pages, the system can properly understand and classify the meaning and sentiment of any given digital text, and accordingly ensure that the web page receives the most appropriate advertising. The system can also ensure that campaigns are placed on pages which are contextually relevant to them, whatever the format and medium. For example, the semantic approach can be used to analyze an advertiser's ad and the website it links to, in order to identify the most relevant matches.

Filtering Out Idle Periods from Location/Content Statistics

Unless there is a system for monitoring eye or head motion in place, it may not be possible to determine if a user is actually viewing digital media. Therefore inferences must be made based on user activity or lack thereof. For example, if a user does not utilize a pointing device for a set period of time, a rule could be made that does not include the duration of any media being on a viewing screen for a prescribed time prior relative to the inactivity. If a screen saver is enabled, a similar rule could be made based on when the screen saver comes on. Similar rules could be made for lack of keystrokes on a keyboard.

Rating Indicators of Relevant Content

In a section above describing the determination of preferred content, key phrases and/or words were mentioned in an example. Also mentioned were descriptive titles of images and/or video's and embedded descriptive tags in this media. After much analysis of these indicators is performed, and subsequent analysis of whether additional media that is presented based on these indicators is viewed, it can be determined which indicators are more statistically valid as pointers to preferred additional content. For example, continuing the example posed earlier, if an image associated with "Johnny Depp" is in view for a long duration, this may be more indicative of the user being interested in "Johnny Depp" than if the phrase "Johnny Depp" appeared in visible text 10 times, and for the same duration as the image. If this was the case, the method for rating interest may include a relative weighting of the various indicators being used.

The argument can be extended to include other indicators including mouse clicks and scroll bar position and duration and the like.

A combination of indicators could be used simultaneously, for example in a polynomial equation where the probability of a user being highly interested in content was a function of the summation of individual indicators multiplied by their respective weighting factors.

Rating Content from Crowd Sourced Indicators

In an embodiment, rating of interest of particular media could be collectively performed by observing indicators of interest from several users that view the same media. By have a collective rating of the media, this information could be used to modify the media to be more directed to more users, or the media could be subdivided to provided content targeted to certain interest groups. The information could also be used to sell advertising to show that certain type of interest groups read the content that is provided.

The present invention may be conveniently implemented using one or more conventional general purpose or specialized digital computers or microprocessors programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. For example, although the illustrations provided herein primarily describe embodiments using vehicles, it will be evident that the techniques described herein can be similarly used with, e.g., trains, ships, airplanes, containers, or other moving equipment. It is intended that the scope of the invention be defined by the following claims and their equivalence.

Figure 3:
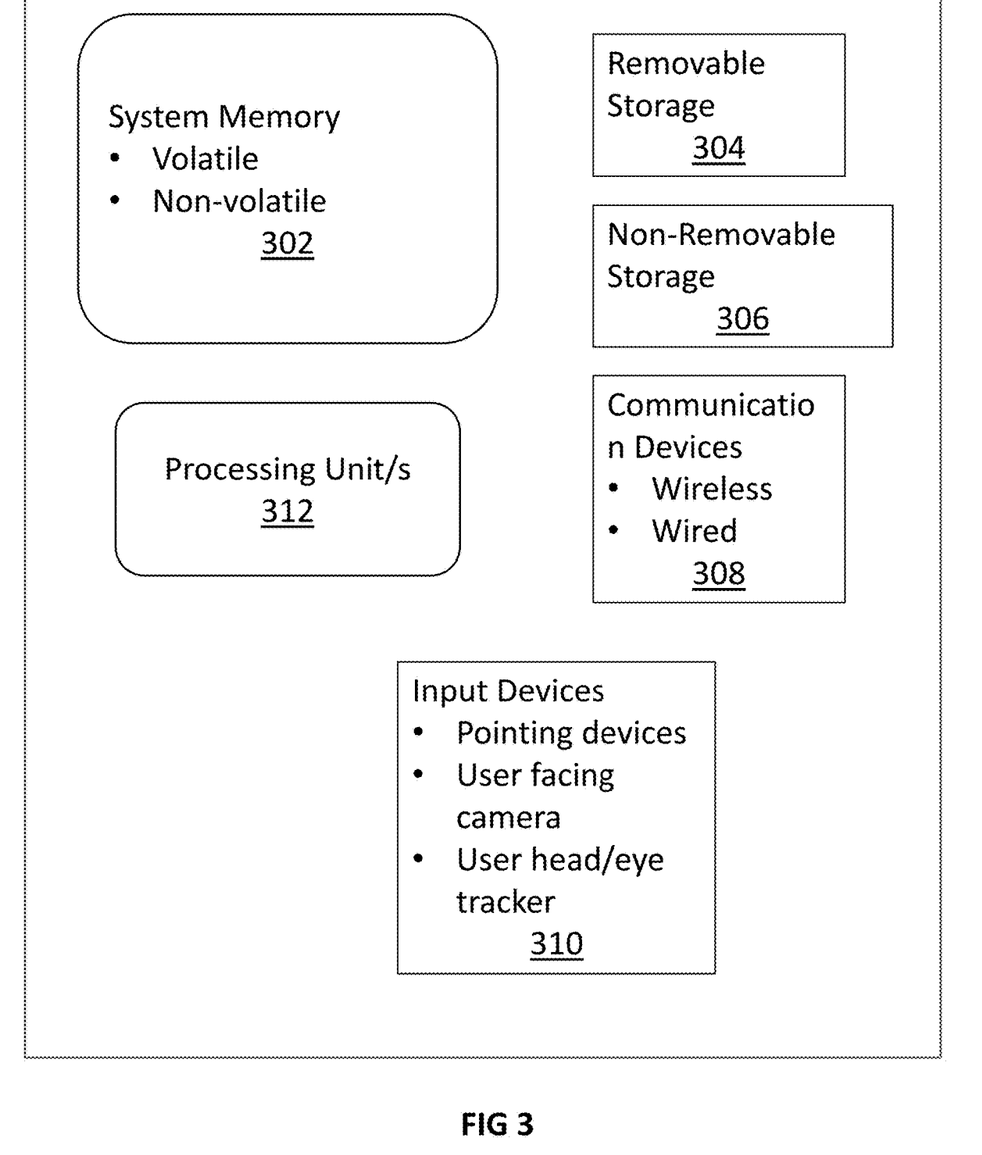
FIG. 3 is an example of processing hardware.

FIG. 3 is schematic of a typical processor an embodiment of the method can run on. The system comprises some form of memory to store both programming and information being accessed 302. One of more processors are used to compute sematic relationships 312. Additional storage for data and programming that does not need immediate access can be either removable or remote storage (cloud based) 304, or non-removable storage 306. Several input devices can be connected to the system which including various pointing devices such as a mouse, a camera facing the user of the system used to monitor facial expressions for example and some form of head or eye tracker which knows the relative position of eyes or the head to the display screen 310.

What is claimed:

1. A method to supply relevant internet-based content to at least one viewer of one or more internet pages comprising:
dividing the one or more internet pages into regions using a processing unit, wherein the regions are defined by a form of the content of the one or more internet pages;
monitoring and tracking the frequency and duration of viewing by the at least one viewer of each region using input devices functionally connected to the processing unit, wherein the tracking of the frequency and duration of viewing by the viewer comprises at least one of monitoring the location and duration time of a pointing device within the confines of each region, and intervals where the pointing device does not move for periods longer than a pre-defined threshold time period are not recorded;
compiling the textural information for each region using the processing unit;
for each region:
sorting out words or phrases that are pre-determined to be of no value for determining user interest;
compiling a list of the most frequently used words and phrases from words that were not sorted out;
for regions viewed by the viewer above a specified threshold viewing frequency and duration, semantically comparing the most frequently used words and phrases to the most frequently used words and phrases of internet based content that can be supplied to the viewer; and
selecting and providing relevant internet based content with semantic similarity above a pre-specified threshold value to the at least one viewer on a display screen as one of:
a display of one of the relevant content and a link to the relevant content in one or more of a specified region or little used region of the one or more webpages, a new page, and a popup.

2. The method of claim 1 wherein the form defining the regions is based on html tags and elements.

3. The method of claim 1 wherein the form defining the regions is based on rectangular sections of the content being displayed.

4. The method of claim 1 wherein the compiled textural information for each region comprises at least one of: displayed text; non-visible text within an underlying webpage definition, image captions and internet links.

5. The method of claim 1 wherein the sorted out words that are pre-determined to be of no value for determining interest comprise words other than nouns and verbs.

6. The method of claim 1 wherein the semantically comparing of the most frequently used words and phrases comprises:
statistical tokenizing and parsing of the frequently used words and phrases;
placing, in one of a memory and storage device operably connected to the processing unit, the tokenized and parsed words and phrases in an associative database contained using conceptual graph formalism; and
comparing the tokenized and parsed words in the associative database to tokenized and parsed words from the additional content using a transformational algebra-based semantic rule-set.

7. The method of claim 1 wherein plural internet pages are divided into regions with each entire internet page defined as one said region.

8. The method of claim 1 wherein the relevant internet-based content is one or more of advertising, images, and internet page links.

9. The method of claim 1 wherein the at least one viewer is a plurality of viewers and the steps of dividing, monitoring and tracking, and compiling for the one or more internet pages are performed collectively for all of the plurality of viewers combined.

10. The method of claim 1 wherein the compiling of the list of most frequently used words and phrases of the one or more internet pages is done prior to the viewing of the at least one viewer of the one or more internet pages.

11. The method of claim 1 further comprising determining whether the additional content supplied to the viewer is also viewed by the viewer and for how long and to further utilize this information to adjust the pre-specified threshold value used for selecting and providing relevant internet based content.

12. The method of claim 1 wherein the monitoring and tracking the frequency and duration of viewing by the at least one viewer is supplemented by observing, using a camera facing the viewer, the facial expressions of the viewer during the viewing of the one or more internet pages wherein a captured facial expression is correlated with interest in the viewing area.

13. A computer based system implemented to supply relevant internet-based content to at least one viewer of one or more internet pages, comprising:
 at least one of a memory and a storage device configured to store:
  internet content;
  semantic relationships between two or more words and phrases within the internet content;
  counts of groupings of semantically related word and phrases within each page of the internet content;
 a display device configured to display internet content;
 an input device configured to monitor what region of the displayed internet content a viewer is looking at and for how long, wherein the input device is configured as a pointing device within the confines of each region, and intervals where the pointing device does not move for periods longer than a pre-defined threshold time period are not recorded;
 a processing unit functionally connected to the at least one memory and storage device, the input device and the display device, configured to:
  divide the one or more internet pages displayed on the display device and viewed by a viewer, into regions, wherein the regions are defined by a form of the content of the one or more internet pages;
  count the number of words and phrases in each semantic group in each region that are the same semantic groups that are counted from within the stored internet content; and
  for regions viewed by the viewer above a specified threshold viewing frequency and duration, comparing the highest count semantic groups within the stored internet content with the most frequently viewed semantic groups; and
  selecting and providing relevant internet based content with semantic similarity to the internet content being viewed on the display screen as one of:
   a display of one of the relevant content and a link to the relevant content in one or more of a specified region or little used region of the one or more webpages, a new page, and a popup.

14. The computer based system of claim 13 wherein the relevant internet-based content is one or more of advertising, images, and internet page links.

15. The computer based system of claim 13 wherein the at least one viewer is a plurality of viewers and the steps of dividing, monitoring and tracking, and compiling for the one or more internet pages are performed collectively for all of the plurality of viewers combined.

16. A method to supply relevant internet-based content to at least one viewer of one or more internet pages comprising:
 dividing the one or more internet pages into regions using a processing unit, wherein the regions are defined by a form of the content of the one or more internet pages, the form defining the regions based on html tags and elements;
 monitoring and tracking the frequency and duration of viewing by the at least one viewer of each region using input devices functionally connected to the processing unit, wherein the tracking of the frequency and duration of viewing by the viewer comprises at least one of monitoring the location and duration time of a pointing device within the confines of each region;
 compiling the textural information for each region using the processing unit;
 for each region:
  sorting out words or phrases that are pre-determined to be of no value for determining user interest;
  compiling a list of the most frequently used words and phrases from words that were not sorted out;
  for regions viewed by the viewer above a specified threshold viewing frequency and duration, semantically comparing the most frequently used words and phrases to the most frequently used words and phrases of internet-based content that can be supplied to the viewer, wherein the semantically comparing of the most frequently used words and phrases comprises statistical tokenizing and parsing of the frequently used words and phrases, placing, in one of a memory and storage device operably connected to the processing unit, the tokenized and parsed words and phrases in an associative database contained using conceptual graph formalism, and comparing the tokenized and parsed words in the associative database to tokenized and parsed words from the additional content using a transformational algebra-based semantic rule-set; and
 selecting and providing relevant internet-based content with semantic similarity above a pre-specified threshold value to the at least one viewer on a display screen as one of:
  a display of one of the relevant content and a link to the relevant content in one or more of a specified region or little used region of the one or more webpages, a new page, and a popup.

* * * * *